(12) United States Patent
Yano et al.

(10) Patent No.: US 10,920,068 B2
(45) Date of Patent: Feb. 16, 2021

(54) TWO-PACK TYPE EPOXY RESIN COMPOSITION

(71) Applicant: CEMEDINE CO., LTD., Tokyo (JP)

(72) Inventors: Shingo Yano, Tokyo (JP); Satoshi Yoshikawa, Tokyo (JP); Naomi Okamura, Tokyo (JP)

(73) Assignee: CEMEDINE CO., LTD., Tokyo (JP)

( * ) Notice: Subject to any disclaimer, the term of this patent is extended or adjusted under 35 U.S.C. 154(b) by 222 days.

(21) Appl. No.: 16/314,037

(22) PCT Filed: Jun. 23, 2017

(86) PCT No.: PCT/JP2017/023183
§ 371 (c)(1),
(2) Date: Dec. 28, 2018

(87) PCT Pub. No.: WO2018/003688
PCT Pub. Date: Jan. 4, 2018

(65) Prior Publication Data
US 2019/0225795 A1    Jul. 25, 2019

(30) Foreign Application Priority Data

Jun. 30, 2016 (JP) .................. 2016-129764

(51) Int. Cl.
| | | |
|---|---|---|
| *C08L 63/00* | (2006.01) | |
| *C08G 59/18* | (2006.01) | |
| *C08G 65/336* | (2006.01) | |
| *B01J 21/06* | (2006.01) | |
| *C08G 65/337* | (2006.01) | |
| *B01J 27/12* | (2006.01) | |
| *C08G 77/38* | (2006.01) | |
| *C08G 77/385* | (2006.01) | |

(52) U.S. Cl.
CPC ............ *C08L 63/00* (2013.01); *C08G 65/336* (2013.01); *B01J 21/06* (2013.01); *B01J 27/12* (2013.01); *C08G 59/18* (2013.01); *C08G 65/337* (2013.01); *C08G 77/38* (2013.01); *C08G 77/385* (2013.01); *C08L 2205/03* (2013.01); *C08L 2312/00* (2013.01); *C08L 2312/08* (2013.01)

(58) Field of Classification Search
None
See application file for complete search history.

(56) References Cited

FOREIGN PATENT DOCUMENTS

| | | | |
|---|---|---|---|
| JP | S61-247723 A | | 11/1986 |
| JP | 63273625 A | * | 11/1988 |
| JP | S63-273625 A | | 11/1988 |
| JP | H02-140269 A | | 5/1990 |
| JP | H02-145674 A | | 6/1990 |
| JP | H02-145675 A | | 6/1990 |
| JP | H09-279047 A | | 10/1997 |
| JP | 2002-309077 A | | 10/2002 |
| JP | 2008-156482 A | | 7/2008 |
| JP | 2008156482 A | * | 7/2008 |
| JP | 2011-178871 A | | 9/2011 |
| WO | 2008/032539 A1 | | 3/2008 |

OTHER PUBLICATIONS

International Search Report for International Application No. PCT/JP2017/023183 dated Sep. 5, 2017 (2 Sheets).

* cited by examiner

*Primary Examiner* — Richard A Huhn
(74) *Attorney, Agent, or Firm* — Kratz, Quintos & Hanson, LLP

(57) ABSTRACT

Provided is a novel curable composition that is a two-pack type curable composition that includes an epoxy resin and a crosslinkable silicon group-containing organic polymer, excels in storage stability, and does not experience curing delays, an increase in viscosity of the base material, or the deterioration of the base material such as gelation or the deposition of insoluble material. Also provided is a novel curable composition that excels in storage stability even when water is added to improve deep portion curability. A two-pack type epoxy composition according to the present invention contains: a base material that includes (A) an epoxy resin, (B) a compound having an Si—F bond, and (C) an alkoxysilane not having at least one group selected from the group consisting of a primary amino group, a secondary amino group, and a mercapto group; and a curing agent that includes (D) a crosslinkable silicon group-containing organic polymer, and (E) a tertiary amine compound.

7 Claims, No Drawings

TWO-PACK TYPE EPOXY RESIN COMPOSITION

TECHNICAL FIELD

The present invention relates to a two-pack type epoxy resin composition. The present invention particularly relates to a two-pack type epoxy resin composition that exhibits excellent storage stability.

BACKGROUND ART

Epoxy resins excel in characteristics such as mechanical characteristics, electrical characteristics, thermal characteristics, chemical resistance, and adhesion strength, and are used in a wide range of fields such as adhesive agents, paints, and insulating materials for electrical and electronic applications. Epoxy resins exhibit these types of excellent characteristics, but also have drawbacks including the cured product being brittle, and the detachment strength being low when used in an adhesive agent.

As compositions for improving this drawback, Patent Document 1 discloses a curable composition that includes an epoxy resin and a crosslinkable silicon group-containing organic polymer. Curing occurs when an epoxy resin and an epoxy resin curing agent are mixed, and therefore the compositions are often prepared as two-pack compositions with the epoxy resin and the epoxy resin curing agent formed as separate components. Thus, with curable compositions that include an epoxy resin and a crosslinkable silicon group-containing organic polymer, it is conceivable that a two-pack type curable composition be formed with: a base material that is configured as a composition containing an epoxy resin and a condensation catalyst for a crosslinkable silicon group-containing organic polymer (hereinafter, the condensation catalyst for a crosslinkable silicon group-containing organic polymer is also referred to as a silanol condensation catalyst); and a curing agent that is configured as a composition containing an epoxy resin curing agent and the crosslinkable silicon group-containing organic polymer.

However, Patent Documents 2 to 4 describe that a problem with such two-pack type curable compositions is that the curing speed decreases after storage (hereinafter, the decrease in the curing speed after storage is also referred to as a curing delay). Furthermore, the present inventors discovered that a problem with a base material containing an epoxy resin and a silanol condensation catalyst is that after storage, the viscosity of the base material increases and deterioration such as gelation or the deposition of insoluble material occurs. This type of deterioration makes handling of the base material and homogeneous mixing with the curing agent difficult.

Patent Documents 2 to 4 disclose, for the purpose of preventing curing delays, compositions that include a specific tin compound as a silanol condensation catalyst in the base material, and compositions that include carboxylic acid and an acidic filler in the base material.

Meanwhile, typically, crosslinkable silicon group-containing organic polymers are often cured by moisture in the air. Accordingly, a curable composition that contains a crosslinkable silicon group-containing organic polymer is cured from the surface that contacts the air, and time is required for curing to proceed as far as the deep portions of the composition (hereinafter, the ease of curing at a deep portion of a curable composition is referred to as deep portion curability). Patent Documents 5 to 7 disclose that in two-pack type curable compositions that include an epoxy resin and a crosslinkable silicon group-containing organic polymer, water is added in advance to the base material that contains the epoxy resin in order to improve deep portion curability. However, as described in paragraph [0005] of Patent Document 7, a problem with base materials to which water has been added is that deterioration such as a separation of the epoxy resin and water occurs during storage.

CITATION LIST

Patent Literature

Patent Document 1: JP S61-247723 A
Patent Document 2: JP H02-140269 A
Patent Document 3: JP H02-145674 A
Patent Document 4: JP H02-145675 A
Patent Document 5: JP S63-273625 A
Patent Document 6: JP H09-279047 A
Patent Document 7: JP 2002-309077 A
Patent Document 8: JP 2008-156482 A
Patent Document 9: WO 2008-032539

SUMMARY OF INVENTION

Technical Problem

The problem to be solved by the present invention is to provide a novel curable composition that is a two-pack type curable composition which includes an epoxy resin and a crosslinkable silicon group-containing organic polymer, excels in storage stability, and does not experience curing delays after storage; an increase in viscosity of the base material; or deterioration of the base material such as gelation or the deposition of insoluble material after storage. Another problem to be addressed by the present invention is to provide a novel curable composition that excels in storage stability even when water is added to improve deep portion curability.

Solution to Problem

Tin compounds are well known as silanol condensation catalysts used in crosslinkable silicon group-containing organic polymers. In Patent Documents 1 to 7 as well, tin compounds are primarily used. However, the present inventors discovered that when compounds having an Si—F bond disclosed by Patent Document 8 and Patent Document 9 are used as a silanol condensation catalyst rather than a tin compound, the above-mentioned issues can be solved. That is, the present invention relates to the following curable composition and relevant inventions.

(1) A two-pack type epoxy composition containing: a base material that includes (A) an epoxy resin, (B) a compound having an Si—F bond, and (C) an alkoxysilane not having at least one group selected from the group consisting of a primary amino group, a secondary amino group, and a mercapto group; and a curing agent that includes (D) a crosslinkable silicon group-containing organic polymer, and (E) a tertiary amine compound.

(2) The two-pack type epoxy resin composition according to (1), wherein the (E) tertiary amine compound is a tertiary amine compound having an active hydrogen group.

(3) The two-pack type epoxy resin composition according to (1) or (2), wherein the base material further includes (F) water.

(4) The two-pack type epoxy resin composition according to any one of (1) to (3), wherein the curing agent further includes (G) an adhesiveness imparting agent.

(5) A method for curing a two-pack type epoxy resin composition, the method including: mixing the base material and the curing agent according to any one of (1) to (4); and curing a mixture of the base material and the curing agent.

(6) A cured product of a two-pack type epoxy resin composition according to any one of (1) to (4).

(7) A product including a cured product of the two-pack type epoxy resin composition according to any one of (1) to (4).

Advantageous Effects of Invention

The two-pack type curable resin composition of the present invention has an effect of excelling in storage stability without experiencing curing delays after storage, an increase in the viscosity of the base material, and deterioration of the base material such as gelation or the deposition of insoluble material. The present invention also has an effect of excelling in storage stability even when water is added to the base material to improve deep portion curability.

DESCRIPTION OF EMBODIMENTS (A) Epoxy Resin

Various epoxy resins can be used as the epoxy resin (A). Examples include bisphenol A epoxy resins, bisphenol F epoxy resins, bisphenol AD epoxy resins, bisphenol S epoxy resins, and hydrogenated epoxy resins thereof, glycidyl ester epoxy resins, glycidyl amine epoxy resins, alicyclic epoxy resins, aliphatic epoxy resins, novolac epoxy resins, urethane modified epoxy resins having a urethane bond, fluorinated epoxy resins, rubber modified epoxy resins (for example, epoxy resins modified with any of the rubbers of polybutadiene, styrene-butadiene rubber (SBR), nitrile rubber (NBR), and CTBN), and glycidyl ether of tetrabromobisphenol A and other such flame retardant epoxy resins. These epoxy resins can be used singly, or two or more types can be combined and used.

Of these epoxy resins, from the perspective of achieving a balance between workability, curability, adhesion strength, adherend versatility, water resistance, and durability, bisphenol A epoxy resins, bisphenol F epoxy resins, bisphenol AD epoxy resins, bisphenol S epoxy resins and hydrogenated epoxy resins thereof are preferable, bisphenol A epoxy resins and bisphenol F epoxy resins are more preferable, and bisphenol A epoxy resins are most preferable.

The molecular weight of the epoxy resin (A) is not particularly limited, but the number average molecular weight thereof is preferably from 300 to 1000 and is more preferably from 350 to 600. Moreover, from the perspective of handling ease, the use of an epoxy resin that is a liquid at normal temperature is preferable.

(B) Compound Having Si—F Bond

The compound (B) having an Si—F bond acts, along with the tertiary amine compound of the component (E), as a curing catalyst on the crosslinkable silicon group-containing organic polymer (D). As the compound (B) having an Si—F bond, any of a low molecular weight compound and a high molecular weight compound can be used. Furthermore, an organic compound having an Si—F bond is preferable, and an organic polymer having an Si—F bond is more preferable because of the high level of safety.

Examples of the compound (B) having an Si—F bond include compounds having a group represented by Formula (1) (hereinafter, groups represented by Formula (1) are also referred to as fluorosilyl groups). Examples of compounds having a fluorosilyl group are disclosed in Patent Document 5.

$$—SiF_aR^1{}_bZ_c \quad (1)$$

(In Formula (1), $R^1$ represents a substituted or unsubstituted hydrocarbon group having from 1 to 20 carbons, or an organosiloxy group represented by $R^2{}_3SiO—$ where $R^2$ represents a substituted or unsubstituted hydrocarbon group having from 1 to 20 carbons, or a fluorine atom, and a is an integer from 1 to 3. Z represents a hydroxyl group or a hydrolyzable group except fluorine, b is any one of 0 to 2, c is any one of 0 to 2, and a+b+c is 3. In a case where a plurality of the $R^1$, $R^2$ and Z moieties are present, these may be the same or different.)

As the hydrolyzable group represented by Z, alkoxy groups are preferable from the perspective of handling ease due to the hydrolyzability being moderate. A methyl group is preferable as $R^1$.

Preferable examples of the fluorosilyl group include silicon groups having no hydrolyzable group except fluorine, and fluorosilyl groups in which $R^1$ is a methyl group. The fluorosilyl group is more preferably a trifluorosilyl group or a methyl difluorosilyl group.

As the compound having a fluorosilyl group, any of an inorganic compound or an organic compound can be used. As the organic compound, any of a low molecular weight compound or a high molecular weight compound can be used. Examples of organic compounds having a fluorosilyl group include compounds having a fluorosilyl group represented by Formula (2).

$$P(SiF_aR^1{}_bZ_c)_n \quad (2)$$

(In Formula (2), P is an n-valent organic group; n is an integer of 1 or greater and is preferably from 1 to 5; $R^1$, a, b, and c are respectively the same as in Formula (1); and a is preferably 2 or 3.)

Examples of low molecular weight compounds represented by Formula (2) include vinyltrifluorosilane, phenyltrifluorosilane, γ-methacryloxypropyltrifluorosilane, octadecyltrifluorosilane, vinyldifluoromethoxysilane, phenyldifluoromethoxysilane, and fluorodimethylphenylsilane.

Examples of high molecular weight compounds having a fluorosilyl group include compounds for which P in Formula (2) is a polymer residue. As such a compound, the various fluorosilyl group-containing organic polymers (hereinafter, fluorosilyl group-containing organic polymers are also referred to as fluorinated polymers) described by Patent Document 5 can be used.

The fluorinated polymer may be a single type of polymer in which the fluorosilyl group and the main chain skeleton are of the same type, that is, the fluorinated polymer may be polymers of a single type having the same number of fluorosilyl groups per molecule, the same bonding positions thereof, the same number of F included in the fluorosilyl groups, and the same main chain skeleton or may be a mixture of a plurality of polymers in which some or all of these conditions are different. Any of these fluorinated polymers can be suitably used as a base material component of the two-pack type epoxy resin composition.

Because of the good handling ease and physical properties, as the main chain skeleton of the fluorinated polymer, polyoxypropylene, polyoxytetramethylene, polyoxyethylene-polyoxypropylene copolymers and other polyoxyalkylene polymers; and (meth)acrylate polymers are preferable, polyoxyalkylene polymers are more preferable, and polyoxypropylene is most preferable.

The fluorinated polymer may be linear or branched. The number average molecular weight of the fluorinated polymer is preferably from 3000 to 100000, more preferably from 3000 to 50000, and even more preferably from 3000 to 30000. When the number average molecular weight is less than 3000, unfavorable conditions tend to occur in elongation characteristics of the cured product, and when the number average molecular weight is greater than 100000, undesirable tendencies may manifest in workability due to the high viscosity. Here, the number average molecular weight is the molecular weight in terms of polystyrene obtained through GPC.

Of the compounds (B) having an Si—F bond, fluorinated polymers are preferable because of the high level of safety. The compounded proportion of the compound (B) having an Si—F bond is not particularly limited but is preferably from 0.01 to 80 parts by mass, and more preferably from 0.05 to 20 parts by mass, per 100 parts by mass of the crosslinkable silicon group-containing organic polymer (D). In a case where a high molecular weight compound having a number average molecular weight of 3000 or greater, such as a fluorinated polymer, is used as the component (B), the compounded proportion is preferably from 0.01 to 80 parts by mass, more preferably from 0.01 to 30 parts by mass, and even more preferably from 0.05 to 20 parts by mass, per 100 parts by mass of the crosslinkable silicon group-containing organic polymer (D). In a case where a low molecular weight compound having a fluorosilyl group and a number average molecular weight of less than 3000 (e.g. inorganic silicon compounds having a fluorosilyl group, and low molecular weight organosilicon compounds having a fluorosilyl group) is used as the component (B), the compounded proportion is preferably from 0.01 to 10 parts by mass; and more preferably from 0.05 to 5 parts by mass, per 100 parts by mass of the crosslinkable silicon group-containing organic polymer (D).

(C) Alkoxysilane Not Having Primary Amino Group and the Like

The alkoxysilane that is the component (C) not having at least one group selected from the group consisting of primary amino groups, secondary amino groups, and mercapto groups has the action of preventing curing delays of the epoxy resin of the present invention and the deterioration of the base material. The reason that this type of action is exhibited is unclear. The compound having an Si—F bond, which is the component (B), hydrolyzes when moisture is present, but the alkoxysilane also hydrolyzes. Therefore, it is thought that the alkoxysilane of the component (C) acts as a dehydrating agent to remove trace amounts of moisture present in the base material; and prevents the compound having an Si—F bond of the component (B) from hydrolyzing, thereby also preventing the curing delay of the epoxy resin and the deterioration of the base material. However, as described below, even in a case where water, which is the component (F), is added to the base material, curing delays and the deterioration of the base material can be prevented. Therefore, it is speculated that curing delays and the deterioration of the base material can be prevented on the basis of the function of the component (C) as a dehydrating agent.

As the alkoxysilane of the component (C), various silane coupling agents that are alkoxy group-containing silanes that do not contain a primary amino group, a secondary amino group, or a mercapto group can be used. Examples include 3-glycidoxypropyltrimethoxysilane, 3-glycidoxypropyltriethoxysilane, 2-(3,4-epoxycyclohexyl)ethyltrimethoxysilane, glycidoxyoctyltrimethoxysilane, 3-glycidoxypropylmethyldimethoxysilane, and 3-glycidoxypropylmethyldiethoxysilane and other epoxy group-containing silanes; 3-(meth)acryloxypropyltrimethoxysilane, vinyltrimethoxysilane, and other vinyl-type unsaturated group-containing silanes; 3-chloropropyltrimethoxysilane and other chlorine atom-containing silanes; 3-isocyanatepropyltrimethoxysilane and other isocyanate-containing silanes; hexyltrimethoxysilane and other alkylsilanes; phenyltrimethoxysilane, diphenyldimethoxysilane, and other phenyl group-containing silanes; tris(3-trimethoxysilylpropyl)isocyanurate and other isocyanurate group-containing silanes; and 3-ureidopropyltrimethoxysilane and other ureido group-containing silanes. Note that cases in which a carbonyl group is bonded to a nitrogen atom such as an ureido group (—NHCONH$_2$) or an amide group (—CONH$_2$), even in the form of a primary amino group and a secondary amino group, are not included in the amino group of the present invention. Furthermore, reaction products of the above-mentioned silanes and condensates obtained by partially condensing the above-mentioned silanes can also be used. Examples of the reaction products and condensates include products of reactions between 1 mole of 3-aminopropyltrimethoxysilane and 2 moles of 3-glycidoxypropyltrimethoxysilane; other such reaction products between an aminosilane and an epoxysilane and between an aminosilane and an isocyanurate silane; and partial condensates of various types of silane coupling agents. In this case, it is required that a primary amino group and a secondary amino group, and also a mercapto group be substantially not present in the reaction product. As an alkoxysilyl group, the silicon compound preferably has a trimethoxysilyl group; a triethoxysilyl group; a dimethoxysilyl group; or a diethoxysilyl group, and a trimethoxysilyl group; a triethoxysilyl group; and dimethoxysilyl group are more preferable, and a trimethoxysilyl group is most preferable.

The compounded proportion of the alkoxysilane of the component (C) is not particularly limited but is preferably from 0.2 to 20 parts by mass, more preferably from 0.3 to 15 parts by mass, and even more preferably from 0.5 to 10 parts by mass, per 100 parts by mass of the crosslinkable silicon group-containing organic polymer (D). These alkoxysilanes of the component (C) may be used alone, or two or more types may be used in combination.

(D) Crosslinkable Silicon Group-Containing Organic Polymer

The crosslinkable silicon group in the crosslinkable silicon group-containing organic polymer (D) is a group that has a hydroxyl group or hydrolyzable group bonded to a silicon atom and that can be crosslinked by forming a siloxane bond. A fluorine atom is not included as a hydrolyzable group. The crosslinkable silicon group is, for example, preferably a group represented by General Formula (3).

[Chemical 1]

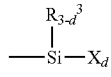

(3)

In Formula (3), $R^3$ represents an organic group. Note that $R^3$ is preferably a hydrocarbon group having from 1 to 20 carbons. Among these, $R^3$ is particularly preferably a methyl group. $R^3$ may have a substituent. X represents a hydroxyl group or a hydrolyzable group, and in a case where two or more X moieties exist, the plurality of X moieties may be the same or different. d is an integer of 1, 2, or 3. In consideration of curability, from the perspective of obtaining a two-pack type epoxy resin composition having a sufficient curing rate, d is preferably 2 or greater, and more preferably 3 in Formula (3). From the perspective of obtaining a two-pack type epoxy resin composition having sufficient flexibility, d is preferably 2.

The hydrolyzable group represented by X is not particularly limited as long as the hydrolyzable group is not an F atom. Examples thereof include alkoxy groups, acyloxy groups, ketoximate groups, aminooxy groups, and alkenyloxy groups. Among these, alkoxy groups are preferable from the perspective of handling ease due to the moderate hydrolyzability. Among alkoxy groups, an alkoxy group having a smaller number of carbons has higher reactivity, and as the number of carbons increases, the reactivity decreases in order of methoxy group >ethoxy group >propoxy group. Although the alkoxy group can be selected based on the purpose and/or use, a methoxy group and/or ethoxy group is typically used.

Examples of the crosslinkable silicon group include trialkoxysilyl groups [—Si(OR)$_3$], such as a trimethoxysilyl group and a triethoxysilyl group; and dialkoxysilyl groups [—SiR$^3$(OR$_2$)], such as a methyldimethoxysilyl group and a methyldiethoxysilyl group. Note that R is an alkyl group such as a methyl group or an ethyl group. The trialkoxysilyl group is more reactive than a dialkoxysilyl group and can be used to prepare a rapid curing composition. In addition, the dialkoxysilyl group is more stable than the trialkoxysilyl group and thus can be used to prepare a stable composition.

Furthermore, one type of crosslinkable silicon group may be used, or two or more types may be used in combination. The crosslinkable silicon group may be bonded to the main chain or a side chain; or to both. From the perspective of excelling in the tensile characteristic and other physical properties of a cured product of the two-pack type epoxy resin composition, the crosslinkable silicon group is preferably present at a molecular chain terminal. With respect to the organic polymer of the component (D), the number of crosslinkable silicon groups present, as an average, in one molecule of the organic polymer is preferably from 1.0 to 5, and more preferably from 1.1 to 3.

Examples of main chain skeleton of the crosslinkable silicon group-containing organic polymer (D) include polyoxyalkylene polymers; polyolefin polymers, hydrogenated polyolefin polymers and other hydrocarbon polymers; polyester polymers; (meth)acrylate polymers and other vinyl polymers; and graft polymers obtained by polymerizing vinyl monomers in an organic polymer. These skeletons may be included singly in the crosslinkable silicon group-containing organic polymer (D), or two or more types of these skeletons may be included in a block or random form.

Furthermore, saturated hydrocarbon polymers such as polyisobutylene, hydrogenated polyisoprene, and hydrogenated polybutadiene; polyoxyalkylene polymers; and (meth)acrylate polymers are preferable because the glass transition temperature is relatively low, and the brittleness of the obtained cured product is well improved. Furthermore, polyoxyalkylene polymers and (meth)acrylate polymers exhibit high moisture permeability and excellent deep portion curability and are therefore particularly preferable.

A polymer having a main chain skeleton that is an oxyalkylene polymer and having a crosslinkable silicon group at a terminal end is a polymer having repeating units essentially represented by General Formula (4).

(In the formula, $R^4$ represents a linear or branched alkylene group having from 1 to 14 carbons and is preferably a linear or branched alkylene group having from 2 to 4 carbons.)

Specific examples of the repeating units represented by General Formula (4) include —CH$_2$CH$_2$O—, —CH$_2$CH(CH$_3$)O—, and —CH$_2$CH$_2$CH$_2$CH$_2$O—. The main chain skeleton of the polyoxyalkylene polymer having the crosslinkable silicon group may be formed from only one type of the repeating units or may be formed from two or more types of the repeating units. A main chain skeleton formed with a polymer containing oxypropylene as a main component is particularly preferable.

The lower limit of the number average molecular weight of the polyoxyalkylene polymer having a crosslinkable silicon group is preferably 15000, more preferably 18000, and even more preferably 20000. As the molecular weight increases, the viscosity of the polymer increases, the viscosity of the two-pack type epoxy resin composition also increases, and therefore the polymer also preferably partially includes a polymer having a number average molecular weight of less than 15000. In addition, the upper limit of the number average molecular weight is 50000 and is more preferably 40000. Note that the number average molecular weight is the molecular weight in terms of polystyrene obtained through gel permeation chromatography. When the number average molecular weight is less than 15000, the tensile modulus and elongation at breakage may be insufficient in some cases, and when the number exceeds 50000, the viscosity of the composition becomes high, and workability decreases.

When the amount of crosslinkable silicon groups included in the polyoxyalkylene polymers is moderately decreased, the crosslinking density of the cured product decreases, and therefore the resulting cured product is more flexible, the modulus characteristic becomes smaller, and the characteristic of elongation at breakage becomes larger. With respect to the polyoxyalkylene polymer, the number of crosslinkable silicon groups present, as an average, per molecule of the polymer is preferably from 1.2 to 2.8, more preferably from 1.3 to 2.6, and even more preferably from 1.4 to 2.4. When the number of crosslinkable silicon groups per molecule is less than 1, curability becomes insufficient, and when the number is too high, the mesh structure becomes overly dense, and therefore favorable mechanical characteristics are not exhibited. Furthermore, in the case of a bifunctional polymer in which the main chain skeleton is linear, the number of crosslinkable silicon groups present, as an average, per molecule of the polymer is preferably not less than 1.2 and less than 1.9, more preferably from 1.25 to 1.8, and even more preferably not less than 1.3 and less than 1.7.

The polyoxyalkylene polymer having a crosslinkable silicon group may be linear or branched. From the perspective of reducing the tensile modulus, the polyoxyalkylene polymer having a crosslinkable silicon group is preferably a linear polymer. In particular, for a case of producing a two-pack type epoxy resin composition to which no plasticizer is blended, the polyoxyalkylene polymer is preferably linear. The molecular weight distribution (Mw/Mn) of the polyoxyalkylene polymer having a crosslinkable silicon group is preferably 2 or less and is particularly preferably 1.6 or less.

The method for synthesizing the polyoxyalkylene polymer is not particularly limited, and examples include a polymerization method that uses an alkali catalyst such as KOH; and a polymerization method that uses a double metal cyanide complex catalyst. According to the polymerization method that uses a double metal cyanide complex catalyst, a polyoxyalkylene polymer having a high molecular weight of a number average molecular weight of 6000 or greater and having a narrow molecular weight distribution Mw/Mn of 1.6 or less can be obtained.

Other components, such as a urethane bonding component, may be included in the main chain skeleton of the polyoxyalkylene polymer. Examples of the urethane bonding component include components obtained by a reaction of a polyoxyalkylene polymer having a hydroxyl group with an aromatic polyisocyanate such as toluene diisocyanate; or with an aliphatic polyisocyanate such as isophorone diisocyanate.

The introduction of the crosslinkable silicon group into the polyoxyalkylene polymer can be performed by reacting a polyoxyalkylene polymer having, in the molecule, a functional group such as an unsaturated group, a hydroxyl group, an epoxy group, or an isocyanate group with a compound having a crosslinkable silicon group and another functional group that is reactive to this functional group (hereinafter, referred to as a "polymer reaction method").

Examples of the polymer reaction method include a method in which hydrosilane having a crosslinkable silicon group or a mercapto compound having a crosslinkable silicon group is allowed to act on an unsaturated group-containing polyoxyalkylene polymer to perform hydrosilylation or mercaptization, and thereby a polyoxyalkylene polymer having a crosslinkable silicon group is obtained. The unsaturated group-containing polyoxyalkylene polymer can be obtained by reacting an organic polymer having a functional group such as a hydroxyl group, with an organic compound having an unsaturated group and an active group that exhibits reactivity to the functional group.

Other examples of polymer reaction methods include a method in which a polyoxyalkylene polymer having a hydroxyl group at a terminal; and a compound having an isocyanate group and a crosslinkable silicon group are reacted and include a method in which a polyoxyalkylene polymer having an isocyanate group at a terminal; and a compound having an active hydrogen group such as a hydroxyl group and an amino group; and a crosslinkable silicon group are reacted. When an isocyanate compound is used, a polyoxyalkylene polymer having a crosslinkable silicon group can be easily obtained.

The polyoxyalkylene polymers having a crosslinkable silicon group may be used alone, or two or more types of these may be used in combination.

As a (meth)acrylate monomer constituting the main chain of the (meth)acrylate polymer, various types of monomers can be used. Examples thereof include (meth)acrylate monomers; alkyl (meth)acrylate monomers such as n-butyl (meth)acrylate and stearyl (meth)acrylate; alicyclic (meth)acrylate monomers; aromatic (meth)acrylate monomers; (meth)acrylate monomers such as 2-methoxyethyl (meth)acrylate; and silyl group-containing (meth)acrylate monomers such as γ-(methacryloyloxypropyl)trimethoxysilane.

With the (meth)acrylate polymer, vinyl monomers can be copolymerized along with (meth)acrylate monomers. Examples of the vinyl monomers include styrene, maleic acid anhydride, and vinyl acetate. In addition, acrylic acids besides these monomers may also be included as monomer units (hereinafter, also referred to as other monomer units).

These may be used singly, or a plurality of these may be copolymerized. From the perspective of physical properties of the resulting product or the like, a polymer formed from (meth)acrylate monomers is preferable. In addition, a (meth)acrylate polymer in which one or more types of alkyl (meth)acrylate monomers are used in combination with other (meth)acrylate monomers as necessary is more preferable. The number of silicon groups in the (meth)acrylate polymer can be controlled by using a crosslinkable silicon group-containing (meth)acrylate monomer in combination. From the perspective of achieving excellent adhesiveness, a methacrylate polymer formed from methacrylate monomers is particularly preferable. Furthermore, the appropriate use of acrylate monomers is preferable when reducing viscosity and imparting flexibility. Note that, (meth)acrylate refers to acrylate and/or methacrylate.

As the method for producing the (meth)acrylate polymer, a radical polymerization method using a radical polymerization reaction can be used, for example. Examples of the radical polymerization method include a radical polymerization method in which predetermined monomer units are copolymerized using a polymerization initiator (free radical polymerization method), and a controlled radical polymerization method that can introduce a crosslinkable silicon group to a controlled position, such as at a terminal. Polymers obtained by a free radical polymerization method that uses an azo-based compound, peroxide, or the like as a polymerization initiator typically have a large molecular weight distribution value of 2 or greater and a high viscosity. Therefore, to obtain a (meth)acrylate polymer having a narrow molecular weight distribution and low viscosity; and having a crosslinkable silicon group at a molecular chain terminal at a high proportion, the use of a controlled radical polymerization method is preferable.

Examples of the controlled radical polymerization method include free-radical polymerization methods and living radical polymerization methods that use a chain transfer agent having a particular functional group. The use of a living radical polymerization method such as atom transfer radical polymerization (ATRP) is preferable. Note that examples of reactions for synthesizing a polymer for which the main chain skeleton is a (meth)acrylate polymer, and a portion thereof is a telechelic polymer (hereinafter, referred to as a "pseudo telechelic polymer") include a reaction that uses a thiol compound having a crosslinkable silicon group; and a reaction that uses a thiol compound having a crosslinkable silicon group and a metallocene compound.

These crosslinkable silicon group-containing organic polymers may be used singly or as a combination of two or more types. Specifically, an organic polymer formed by blending at least two types selected from the group consisting of polyoxyalkylene polymers having a crosslinkable silicon group, saturated hydrocarbon polymers having a crosslinkable silicon group, and (meth)acrylate polymers having a crosslinkable silicon group can also be used. In particular, an organic polymer formed by blending a polyoxyalkylene polymer having a crosslinkable silicon group and a (meth)acrylate polymer having a crosslinkable silicon group has excellent characteristics. When such an organic polymer is applied to the two-pack type epoxy resin composition of the present invention, the elongation rate at maximum load, and the adhesive force can be increased.

Various methods can be used as the method for producing an organic polymer formed by blending a polyoxyalkylene polymer having a crosslinkable silicon group and a (meth) acrylate polymer having a crosslinkable silicon group. For example, a method can be used in which the organic polymer is produced by blending a polyoxyalkylene polymer having a crosslinkable silicon group with a copolymer of a (meth) acrylate monomer unit having a crosslinkable silicon group and having a molecular chain that is substantially represented by General Formula (5):

$$—CH_2—C(R^5)(COOR^6)— \qquad (5)$$

where $R^5$ represents a hydrogen atom or a methyl group, and $R^6$ represents an alkyl group having from 1 to 5 carbons. A preferable example is an alkyl group having 1 or 2 carbons. $R^6$ may be singular, or two or more types may be mixed;

and a (meth)acrylate monomer unit represented by General Formula (6):

$$—CH_2—C(R^5)(COOR^7)— \qquad (6)$$

where $R^5$ is the same as described above, and $R^7$ represents an alkyl group having 6 or more carbons. Preferable examples include long chain alkyl groups having 8 to 20 carbons, such as a 2-ethylhexyl group and a stearyl group. $R^7$ may be singular, or two or more types may be mixed.

Here, "substantially" indicates that the total amount of the monomer units of Formulas (5) and (6) present in the copolymer is greater than 50 mass %. The total amount of the monomer units of Formulas (5) and (6) is preferably 70% by mass or greater. Furthermore, the abundance ratio of the monomer units of Formula (5) to the monomer units of Formula (6) is, in terms of a mass ratio, preferably from 95:5 to 40:60, and more preferably from 90:10 to 60:40.

The number average molecular weight of the (meth) acrylate polymers having a crosslinkable silicon group is preferably from 600 to 10000, more preferably from 1000 to 5000, and even more preferably from 1000 to 4500. When the number average molecular weight is set to within this range, compatibility with the polyoxyalkylene polymer having a crosslinkable silicon group can be enhanced. The (meth)acrylate polymers having a crosslinkable silicon group may be used alone, or two or more types of these may be used in combination. The compounding ratio between the polyoxyalkylene polymer having a crosslinkable silicon group and the (meth)acrylate polymer having a crosslinkable silicon group is not particularly limited, The amount of the (meth)acrylate polymer is preferably in the range of 10 to 60 parts by mass, more preferably in the range of 20 to 50 parts by mass, and even more preferably in the range of 25 to 45 parts by mass, per 100 parts by mass of the total of the (meth)acrylate polymer and the polyoxyalkylene polymer. The amount of the (meth)acrylate polymer that is greater than 60 parts by mass is not preferable because viscosity becomes high and thus workability becomes poor.

Also, an organic polymer formed by blending a saturated hydrocarbon polymer having a crosslinkable silicon group and a (meth)acrylate copolymer having a crosslinkable silicon group can also be used in the present invention. As another method of producing the organic polymer formed by blending the (meth)acrylate copolymer having a crosslinkable silicon group, a method in which polymerization of (meth)acrylate monomers is performed in the presence of a crosslinkable silicon group-containing organic polymer can be used.

The compounded proportion of the crosslinkable silicon group-containing organic polymer (D) is from 20 to 1000 parts by mass, preferably from 50 to 500 parts by mass, and more preferably from 70 to 200 parts by mass, per 100 parts by mass of the epoxy resin (A).

(E) Tertiary Amine Compound

The tertiary amine compound (E) acts as a curing catalyst on the epoxy resin (A). The tertiary amine compound (E) also acts, along with the compound (B) having an Si—F bond, as a silanol condensation catalyst of the crosslinkable silicon group-containing organic polymer (D). Various substances such as polyfunctional amines and acid anhydrides are known as epoxy resin curing agents, but in the present invention, a tertiary amine compound (E) is used as a curing catalyst for the epoxy resin (A) in order to effectively improve the brittleness of the cured product. When a tertiary amine compound is used, the epoxy group undergoes a ring-opening reaction, a cured product of the crosslinkable silicon group-containing organic polymer becomes a continuous phase, and an epoxy resin cured product becomes an island phase (particles). It is presumed that through this sea-island structure, the cured article can be provided with both flexibility and toughness. Also, the tertiary amine compound (E) is a ring-opening reaction catalyst, and thus it may be added in a small amount. Note that a primary amine curing agent and a secondary amine curing agent undergo an addition reaction with the epoxy groups and thus bond with the epoxy groups in an equimolar manner; therefore, a large amount of the curing agent needs to be used, and a sea-island structure is not easily generated. Thus, primary and secondary amine curing agents are not preferable.

As described above, the tertiary amine compound (E) also acts as a silanol condensation catalyst of the crosslinkable silicon group-containing organic polymer (D). However, the activity of the tertiary amine compound (E) as a condensation catalyst by itself is small, but the tertiary amine compound (E) does exhibit condensation catalyst activity along with the Si—F bond-containing compound of the component (B). Accordingly, in the curing agent of an embodiment of the present invention, even in a case where the crosslinkable silicon group-containing organic polymer (D) and the tertiary amine compound (E) coexist, the component (D) is not substantially cured.

Examples of the tertiary amine compound (E) include N,N'-dimethylpiperazine and other alicyclic amines; benzyldimethylamine, 2-(dimethylaminomethyl)phenol, 2,4,6-tris(dimethylaminomethyl)phenol and other aliphatic aromatic amines; morpholine, N-methylmorpholine, and other amines having ether bonds; triethanolamine and other hydroxyl group-containing amines; epoxy modified amines obtained by reacting epoxy compounds with amines, Mannich modified amines obtained by reacting formalin and phenols with amines, Michael addition modified amines, ketimines, and other modified amines; and 2-ethylhexanoate of 2,4,6-tris(dimethylaminomethyl)phenol and other amine salts. Another example is a strongly basic amidine compound having at least one tertiary amino group. Here, an amidine compound is a compound represented by the following General Formula (7):

$$R^8N=CR^9—NR^{10}{}_2 \qquad (7)$$

where $R^8$, $R^9$ and two $R^{10}$ are each independently a hydrogen atom or an organic group. In addition, $R^8$ and $R^{10}$ may together form a ring structure.

Examples include imidazole, 2-ethyl-4-methylimidazole and other imidazoles; 2-methylimidazoline, 2-phenylimidazoline, and other imidazolines; 1,8-diazabicyclo[5,4,0]undecene-7 (DBU), 6-(dibutylamino)-1,8-diazabicyclo[5,4,0]

undecene-7 (DBA-DBU), 1,5-diazabicyclo[4,3,0]nonene-5 (DBN), and other cyclic amidines; DBU-phenolate, DBU-octylate, DBU-p-toluenesulfonate, and DBU-phenol novolac resin salt, and other amidine salts. These tertiary amine compounds may be used alone, or two or more types of these may be used in combination.

From the perspective of a curing catalyst for the epoxy resin (A), the use of a tertiary amine compound having an active hydrogen as the tertiary amine compound (E), or the use of a compound having an active hydrogen along with the tertiary amine compound (E) is preferable. Active hydrogen has an effect of improving the activity of the tertiary amine compound and accelerating the reaction speed. The effect of accelerating the reaction speed is in order of phenols >acids >alcohols. Note that for a case in which a compound having an active hydrogen is used in combination with a tertiary amine compound (E), a compound having an active hydrogen may be added to the curing agent and may be added to the base material, but being added to the curing agent is preferable. Examples of groups having an active hydrogen include phenolic hydroxyl groups; alcoholic hydroxyl groups; and carboxyl groups, sulfone groups, and other acidic groups. Tertiary amine compounds having an active hydrogen are also presented in the above described specific examples of tertiary amine compounds (E) including, for example, 2-(dimethylaminomethyl)phenol and 2,4,6-tris(dimethylaminomethyl)phenol. Of these, 2,4,6-tris(dimethylaminomethyl)phenol is the most preferable tertiary amine compound. Examples of compounds having an active hydrogen includes alkylphenols and other phenols; and tetrahydrophthalic acid and other carboxylic acid group-containing compounds.

From the perspective of the silanol condensation catalyst of the crosslinkable silicon group-containing organic polymer (D), among the tertiary amine compounds, strongly basic compounds having a pKa value of a conjugate acid of 11 or greater and salts of such strongly basic compounds exhibiting a high level of catalytic activity are therefore preferable. Examples of such compounds include amidine compounds and amidine salt compounds. In particular, DBU, DBA-DBU, DBN, and other cyclic amidines having a pKa value of the conjugate acid of 12 or greater are more preferable, and DBU and DBN are most preferable.

Furthermore, amidine salt compounds can also be used. As amidines that are used in the amidine salt compounds, cyclic amidines are preferable. As the acid used in the amidine salt compound, carboxylic acid; carboxylic anhydride; and sulfonic acid are preferable, and from the perspective of good stability with a low viscosity increase rate, carboxylic acid is more preferable. The use of a phenolate is preferable from the perspective of having a large curing catalyst action on the epoxy resin (A).

Note that for a case in which the crosslinkable silicon group-containing organic polymer (D) has a highly reactive crosslinkable silicon group (for example, a trimethoxysilyl group), a tertiary amine compound that is not a strong base can be used to cure the component (D) even without using a strongly basic compound or a salt of a strongly basic compound.

From the perspectives of both a curing catalyst for the epoxy resin (A) and a silanol condensation catalyst for the crosslinkable silicon group-containing organic polymer (D), the use of 2,4,6-tris(dimethylaminomethyl)phenol or other tertiary amine compounds having an active hydrogen as the tertiary amine compound (E) in combination with DBU (1,8-diazabicyclo[5,4,0]undecene-7) or other strong bases or salt thereof is preferable.

The compounded proportion of the tertiary amine compound (E) is preferably from 1 to 60 parts by mass, more preferably from 2 to 50 parts by mass, and even more preferably from 4 to 40 parts by mass per 100 parts by mass of the epoxy resin (A).

For a case in which a tertiary amine compound having an active hydrogen as the component (E) is used in combination with a strong base or salt thereof, the content of the tertiary amine compound having an active hydrogen is preferably from 1 to 60 parts by mass, more preferably from 2 to 50 parts by mass, and even more preferably from 4 to 40 parts by mass, per 100 parts by mass of the epoxy resin (A), and the content of the strong base or salt thereof is preferably at least 0.1 parts by mass, more preferably from 0.5 to 20 parts by mass, and most preferably from 0.5 to 10 parts by mass, per 100 parts by mass of the crosslinkable silicon group-containing organic polymer (D). Moreover, the compounded proportion of the compound (B) having an Si—F bond and the strong base or salt thereof (component (B):strong base or salt) is, in terms of a mass ratio, preferably 1:0.001 to 1:20, and more preferably 1:0.005 to 1:10.

Other Compounded Substances

Other compounded substances can be used, as necessary, in the two-pack type epoxy resin composition of an embodiment of the present invention. Examples of other compounded substances include (F) water, (G) adhesiveness imparting agents, compounds that are epoxy resin curing agents besides the component (E), compounds that are silanol condensation catalysts besides the component (E), fillers, diluents, UV absorbers, anti-aging agents, plasticizers, thixotropic agents, flame retardants, tackifying agents, anti-sagging agents, physical property adjustment agents, and coloring agents. Other compatible polymers may also be blended.

(F) Water

Water can be added to the epoxy resin composition of an embodiment of the present invention in order to improve deep portion curability. When water is added to the epoxy resin composition in advance, curing begins simultaneously at the surface and at deep portions, and this improves deep portion curability. Water may be added to the base material or may be added to the curing agent, but being added to the base material is preferable. In an embodiment of the present invention, even in a case where water is added to the base material, the separation of water and the like, an increase in viscosity, and gelation do not occur, and the base material does not deteriorate.

The amount of the water (F) to be used is preferably in a range from 0.1 to 10 parts by mass, and more preferably from 0.3 to 7 parts by mass, per 100 parts by mass of the total of the epoxy resin (A), the compound (B) having an Si—F bond, and the alkoxysilane of the component (C).

(G) Adhesiveness Imparting Agent

An adhesiveness imparting agent (G) can be added to the epoxy resin composition of an embodiment of the present invention. An addition of an adhesiveness imparting agent (G) can improve the adhesiveness of cured product to various adherends such as metal, plastic and glass. The adhesiveness imparting agent (G) may be added to the base material or may be added to the curing agent. Various silane coupling agents can be used as the adhesiveness imparting agent (G). Note that silane coupling agents are presented as an example of the alkoxysilanes of the component (C) used in the base material. In a case where silane coupling agents are used as the component (C), it is presumed that these silane coupling agents also act as adhesiveness imparting agents.

Examples of the adhesiveness imparting agent (G) include 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, 1,3-diaminoisopropyltrimethoxysilane, and other amino group-containing silanes; 3-trimethoxysilyl-N-(1,3-dimethylbutylidene)propylamine and other ketimine group-containing silanes; 3-mercaptopropyltrimethoxysilane and other mercapto group-containing silanes; and silane coupling agents exemplified as the alkoxysilanes of the component (C).

As the adhesiveness imparting agent (G), from the perspective of being able to further improve adhesiveness, amino group-containing silanes; ketimine group-containing silanes; reaction products of an amino group-containing silane and epoxysilane; and reaction products of an amino group-containing silane and isocyanate silane are preferable, amino group-containing silanes; and reaction products of an amino group-containing silane and epoxysilane are more preferable, and amino group-containing silanes are most preferable.

Alkoxysilanes having a primary amino group, a secondary amino group or a mercapto group, and particularly alkoxysilanes having a primary amino group are effective as adhesiveness imparting agents. In a case where the use of these alkoxysilanes is desired, they are added to the curing agent.

The compounded proportion of the adhesiveness imparting agent (G) is not particularly limited but is preferably from 0.2 to 20 parts by mass, more preferably from 0.3 to 15 parts by mass, and even more preferably from 0.5 to 10 parts by mass, per 100 parts by mass of the crosslinkable silicon group-containing organic polymer (D). These adhesiveness imparting agents (G) may be used alone, or two or more types may be used in combination.

As the compounds that are epoxy resin curing agents besides the component (E), one type or a plurality of types of epoxy resin curing agents that are ordinarily available commercially can be selected and used. Examples of this type of curing agent include alicyclic amines, aliphatic amines containing an aromatic ring, aromatic amines, modified amines, and other primary amines; linear secondary amines and other secondary amines; aromatic acid anhydrides, cyclic aliphatic acid anhydrides, aliphatic acid anhydrides, and other acid anhydrides; polyamide resins, organic acid hydrazides, synthetic resin initial condensates, polyvinylphenol, and other curing agents; and compounds for which the amino group has been ketiminated. Of course, the compounds that are epoxy resin curing agents besides the component (E) need to be used within a scope in which the object and effects of the present invention can be achieved.

Examples of the compounds that are silanol condensation catalysts other than the component (E) include dibutyltin dilaurate, dibutyltin diacetate, a reaction product between dioctyltin oxide and a silicate compound, a reaction product between dibutyltin oxide and a phthalic acid ester, and other organotin compounds; tin carboxylate, bismuth carboxylate, iron carboxylate, and other metal carboxylates; aliphatic amines and aromatic amines; versatic acid and other carboxylic acids; diisopropoxy titanium bis(ethyl acetoacetate) and other titanium compounds, aluminum compounds and other alkoxy metals; inorganic acids; boron trifluoride ethyl amine complex and other boron trifluoride complexes; and aluminum monoacetylacetonate bis(ethyl acetoacetate) and other metal chelate compounds. Among these, organotin compounds are preferable. Of course, the compounds that are silanol condensation catalysts other than the component (E) need to be used within a scope in which the object and effects of the present invention can be achieved.

Examples of fillers include fumed silica, precipitated silica, silicic anhydride, carbon black, and other reinforcing fillers; calcium carbonate, magnesium carbonate, diatomaceous earth, calcined clay, clay, talc, hardened titanium, bentonite, organic bentonite, iron (III) oxide, zinc oxide, active zinc oxide, shirasu balloons, and other fillers; and glass fibers, filaments, and other fibrous fillers.

For cases in which these fillers are used to obtain a cured product with high strength, the primarily use of a filler selected from, for example, fumed silica, carbon black, and fine calcium carbonate that has been surface treated is preferable. Moreover, for cases in which a low strength cured product with a high elongation property is to be obtained, the primarily use of a filler selected from, for example, titanium oxide, calcium carbonate, magnesium carbonate, and shirasu balloons is preferable. These fillers can be used singly, or two or more types can be combined and used.

When the cured product of the epoxy resin composition of an embodiment of the present invention is exposed to high temperatures for a long period of time, a reaction of the unreacted crosslinkable silyl groups progresses once again, and the crosslinking density may become too high, resulting in the cured product becoming hard and the elongation property decreasing (hereinafter, this type of phenomenon is referred to as overcuring). A composition that contains a metal carbonate such as calcium carbonate among the above-described fillers and the components (A) to (E) of an embodiment of the present invention has a merit of not overcuring. The reason why overcuring can be prevented is unclear but is thought to be due to the deactivation of the Si—F bond-containing compound (B), which remains even after curing, by the following mechanism.

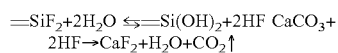

[Reaction 2]

From the perspective of being able to improve heat resistance, the metal carbonate is preferably magnesium carbonate, calcium carbonate, barium carbonate, or zinc carbonate, more preferably magnesium carbonate or calcium carbonate, and most preferably calcium carbonate. In addition, the average particle size of the metal carbonate is preferably from 0.01 μm to 100 μm, and more preferably from 0.01 μm to 10 μm. Furthermore, as the metal carbonate, a metal carbonate that has been surface treated with, for example, a fatty acid, a resin acid, or a silane coupling agent can also be used.

Examples of the calcium carbonate include heavy calcium carbonate, precipitated calcium carbonate (light calcium carbonate), and colloidal calcium carbonate. From the perspective of better excelling in workability and thixotropy, the combined use of heavy calcium carbonate and surface treated colloidal calcium carbonate is preferable.

The compounded proportion of the metal carbonate is not particularly limited, but the metal carbonate is preferably compounded at an amount from 1 to 250 parts by mass, and more preferably from 10 to 200 parts by mass, per 100 parts by mass of the crosslinkable silicon group-containing organic polymer (D). These metal carbonates may be used alone, or two or more types may be used in combination.

The physical properties such as viscosity can be adjusted by blending a diluent. Examples of the diluent include saturated hydrocarbon-based solvents such as normal paraffin and isoparaffin, α-olefin derivatives such as Linealene Dimer (trade name; available from Idemitsu Kosan Co., Ltd.); aromatic hydrocarbon-based solvents; alcohol-based solvents; ester-based solvents, citrate-based solvents such as acetyltriethyl citrate; ketone-based solvents; and other various solvents.

When the safety of the epoxy resin composition of the present invention and the dilution effect are both considered, as the diluent, saturated hydrocarbon-based solvents are preferable, and normal paraffin and isoparaffin are more preferable. The number of carbons of the normal paraffin and isoparaffin is preferably from 10 to 16.

When a UV absorber is used, the light degradation of the cured product of the present invention can be prevented, and weather resistance can be improved. Examples of UV absorbers include benzotriazole-based, triazine-based, benzophenone-based, benzoate-based, and other such UV absorbers.

When an anti-aging agent is used, the thermal degradation of the epoxy resin composition of an embodiment of the present invention can be prevented, and weather resistance can be improved. Examples include amine-ketone-based anti-aging agents and other such anti-aging agents, aromatic secondary amine-based anti-aging agents, benzimidazole-based anti-aging agents, thiourea-based anti-aging agents, and phosphorous acid-based anti-aging agents.

When a plasticizer is used, the elongation property of the cured product can be improved, and the hardness can be adjusted to achieve a low modulus. Examples of the plasticizer include dioctylphthalate and other phthalates; dioctyl adipate and other aliphatic dibasic acid esters; glycol esters; aliphatic esters; phosphates; polyester-based plasticizers; polypropylene glycol and derivatives thereof; and other polyethers; hydrocarbon-based plasticizers; chlorinated paraffins; and low molecular weight acrylate polymers. These plasticizers may be used alone, or two or more types may be used in combination. When an acrylate polymer is used in particular, the weather resistance of the cured product can be improved.

Examples of thixotropic agents include colloidal silica and other inorganic thixotropic agents, organic bentonite, modified polyesterpolyol, fatty acid amide and other organic thixotropic agents, hydrogenated castor oil derivatives, fatty acid amide wax, aluminum stearate, and barium stearate.

Examples of flame retardants include aluminum hydroxide, magnesium hydroxide, and other metal hydroxides; red phosphorous, ammonium polyphosphate, and other phosphorous-based flame retardants; antimony trioxide and other metal oxide-based flame retardants; bromine-based flame retardants; and chlorine-based flame retardants.

The use of a tackifying agent is preferable from the perspectives of improving wettability onto the adherend and increasing detachment strength. Examples of the tackifying agent include petroleum resin-based, rosin-rosin ester-based, acrylic resin-based, terpene resin, hydrogenated terpene resin, and other phenolic resin copolymers, phenol-phenol novolac resin-based, and other such tackifying resins.

Method for Curing Two-Pack Type Epoxy Resin Composition

The method for curing the two-pack type epoxy resin composition of an embodiment of the present invention includes a step of preparing a base material and a curing agent, a step of mixing the base material and the curing agent, and a step of curing the mixture of the base material and the curing agent. For the purpose of facilitating curing, the curing step can include a heating step of heating the mixture of the base material and curing agent. Through the curing method, the two-pack type epoxy resin composition is cured, and thereby a cured product of the two-pack type epoxy resin composition is obtained.

Application Fields and the Like of Two-Pack Type Epoxy Resin Composition

The two-pack type epoxy resin composition of an embodiment of the present invention can be used, for example, as an adhesive agent, potting materials, coating materials, sealing materials, tacky adhesive materials, paints, putty materials and/or primers. The two-pack type epoxy resin composition of an embodiment of the present invention excels in adhesiveness, storage stability, and curability, and therefore is particularly preferably used as an adhesive agent. The two-pack type epoxy resin composition of an embodiment of the present invention can also be used, for example, in various electrical and electronic fields, in automobile applications, in building applications, and in civil engineering applications.

EXAMPLES

Synthesis Example 1: Synthesis of Polyoxyalkylene Polymer (1)

Powdered caustic soda, bromochloromethane as a chain extender, and allyl chloride as an allylating agent were reacted with a mixture of polyoxypropylene diol having a molecular weight of approximately 3000 and polyoxypropylene triol having a molecular weight of approximately 3100, and an allyl ether group-terminated polyoxypropylene having a branch and a number average molecular weight of 16000 was obtained. After a purification treatment, methyldimethoxysilane, which is a hydrosilyl compound, was reacted in the presence of a platinum catalyst, and a polyoxyalkylene polymer (1) having a methyldimethoxysilyl group at a terminal end, and having, as an average, 1.8 crosslinkable silicon groups per molecule was obtained. Note that the number average molecular weight is the molecular weight in terms of polystyrene measured using the HLC-8120GPC available from Tosoh Corporation as the liquid delivery system, the TSK-GELH type column available from Tosoh Corporation, and THF as the solvent. The number average molecular weights of the following synthesis examples were also measured in the same manner as described above.

Synthesis Example 2: Synthesis of Polyoxyalkylene Polymer (2)

Propylene oxide was reacted using propylene glycol as an initiator in the presence of a zinc hexacyanocobaltate-glyme complex catalyst to obtain a hydroxyl group-terminated polyoxypropylene with a number average molecular weight of 20000. A methanol solution of $NaOCH_3$ was added to this hydroxyl group-terminated polyoxypropylene polymer, the methanol was removed by distillation, and allyl chloride was further added to convert the terminal hydroxyl group to an allyl group. After a desalination and purification treatment, methyldimethoxysilane, which is a hydrosilyl compound, was reacted in the presence of a platinum catalyst, and a polyoxyalkylene polymer (2) having a methyldimethoxysilyl group at a terminal end, and having, as an average, 1.6 crosslinkable silicon groups per molecule was obtained.

Synthesis Example 3: Synthesis of Polyoxyalkylene Polymer (3)

Propylene oxide was reacted using polyoxypropylene triol having a molecular weight of approximately 3000 as an initiator in the presence of a zinc hexacyanocobaltate-glyme complex catalyst to obtain a partially branched hydroxyl group-terminated polyoxypropylene with a number average molecular weight of 25000. A methanol solution of NaOCH$_3$ was added to this hydroxyl group-terminated polyoxypropylene polymer, the methanol was removed by distillation, and allyl chloride was further added to convert the terminal hydroxyl group to an allyl group. After a desalination and purification treatment, trimethoxysilane, which is a hydrosilyl compound, was reacted in the presence of a platinum catalyst, and a polyoxyalkylene polymer (3) having a trimethoxysilyl group at a terminal end, and having, as an average, 1.8 crosslinkable silicon groups per molecule was obtained.

Synthesis Example 4: Synthesis of an Acrylic Polymer (1)

An amount of 43 g of toluene was charged into a flask equipped with a stirring device, a nitrogen gas introduction tube, a thermometer, and a reflux cooler, and then heated to 110° C. Subsequently, a solution, in which a mixture of 6.0 g of butyl acrylate, 66 g of methyl methacrylate, 13 g of stearyl methacrylate, 5.4 g of 3-methacryloxypropylmethyldimethoxysilane, 7.0 g of 3-mercaptopropylmethyldimethoxysilane, 23 g of toluene, and 2.6 g of azobisisobutyronitrile as a polymerization initiator were dissolved, was added dropwise over 4 hours, and then reacted for 2 hours. After the completion of the reaction, an evaporator was used to remove the toluene, and an acrylic polymer (1) having a number average molecular weight of 2200 and an average of 1.75 crosslinkable silicon groups per molecule was obtained.

Synthesis Example 5: Synthesis of Fluorinated Polymer

Propylene oxide was reacted using polyoxypropylene diol having a molecular weight of approximately 2000 as an initiator in the presence of a zinc hexacyanocobaltate-glyme complex catalyst to obtain a hydroxyl group-terminated polyoxypropylene with a number average molecular weight of 15000. A methanol solution of NaOCH$_3$ was added to this hydroxyl group-terminated polyoxypropylene polymer, the methanol was removed by distillation, and allyl chloride was further added to convert the terminal hydroxyl group to an allyl group. After a desalination and purification treatment, methyldimethoxysilane, which is a hydrosilyl compound, was reacted in the presence of a platinum catalyst, and a polyoxyalkylene polymer (4) having a methyldimethoxysilyl group at a terminal end, and having, as an average, 1.7 crosslinkable silicon groups per molecule was obtained.

Next, 2.4 g of a BF$_3$ diethylether complex, 1.6 g of dehydrated methanol, 100 g of the polyoxyalkylene polymer (4) having a crosslinkable silicon group, and 5 g of toluene were used, and a polyoxyalkylene polymer having a fluorosilyl group at a terminal end (hereinafter, referred to as a fluorinated polymer) was obtained in accordance with the method of Synthesis Example 6 of JP 2009-215330 A. The $^1$H-NMR spectrum of the obtained fluorinated polymer was measured (measured in a CDCl$_3$ solvent using the NMR 400 available from Shimadzu Corporation), and a peak (m, 0.63 ppm) that corresponded to the silylmethylene (—CH$_2$—Si) of the crosslinkable silicon group-containing polyoxyalkylene polymer (4), which was the raw material, disappeared, and a broad peak appeared at the low magnetic field side (0.7 ppm or greater).

Examples 1 to 19 and Comparative Examples 1 to 7

For each of the examples and comparative examples, the various compounding substances were mixed at the compounded proportions shown in Table 1, the mixture was degassed and stirred at 25° C., and the base material and curing agent were prepared. Water was not added to the compositions of these examples and comparative examples. Each of the following items was measured with regard to the obtained base materials and curing agents. The results are shown in Table 1. Note that in Table 1 and the below-described Table 2, the unit of the compounded amount of each compounded substance is "g".

1) Tack-Free Time (TFT)

The dry to the touch time (initial tack-free time) of the curable composition immediately after the base material and curing agent were mixed was measured (measurement conditions: 23° C. and 50% RH) in accordance with JIS A1439 5.19. In addition, a glass bottle was filled with the base material, and then left inside a hot air circulating type dryer adjusted to 50° C. After four weeks had passed, the dry to the touch time (tack-free time after 50° C.×4 W) of the curable composition immediately after the base material and curing agent were mixed was measured (measurement conditions: 23° C. and 50% RH). Furthermore, the delay rate of the tack-free time was calculated by dividing the tack-free time after 50° C.×4 W by the initial tack-free time. The evaluation criteria were as follows.

Cases with a TFT delay rate after 4 weeks of storage of less than 1.2 were evaluated as being "excellent", cases with a TFT delay rate from 1.2 to 1.4 were evaluated as being "good", and cases with a TFT delay rate of 1.5 or greater were evaluated as being "poor".

2) Storage Stability of Base Material

After the base material was prepared, the base material was left stationary for 24 hours at 23° C. and 50% RH, after which the viscosity of the base material was measured using a BH type rotational viscometer in accordance with JIS K6833. The obtained viscosity was used as the initial viscosity (measurement conditions: 23° C. and 50% RH). In addition, a glass bottle was filled with the base material, and then left inside a hot air circulating type dryer adjusted to 50° C. After 4 weeks had passed, the glass bottle filled with the base material was left stationary for 24 hours at 23° C. and 50% RH, after which the viscosity was measured in the same manner described above, and this viscosity was used as the 50° C.×4 W viscosity (in other words, the viscosity after storage). The viscosity increase rate was then calculated from the viscosity after storage and the initial viscosity and evaluated in accordance with the following evaluation criteria.

Cases with a viscosity increase rate of less than 1.3 were evaluated as being "excellent", cases with a viscosity increase rate from 1.3 to less than 1.5 were evaluated as being "good", cases with a viscosity increase rate from 1.5 to less than 2.0 were evaluated as being "fair", and cases with a viscosity increase rate of 2.0 or greater and for which separation and precipitation occurred were evaluated as being "poor". Note that "separation and precipitation" indicates a state in which the epoxy resin composition separates into a top layer and a bottom layer, and components with a high specific gravity gather in the bottom layer portion, making the bottom layer portion turbid.

3) Storage Stability of Curing Agent

After the curing agent was prepared, the curing agent was left stationary for 24 hours at 23° C. and 50% RH, after which the initial viscosity was measured in the same manner as with the base material. In addition, a glass bottle was filled with the curing agent, and then left inside a hot air circulating type dryer adjusted to 50° C. After 4 weeks had passed, the glass bottle filled with the curing agent was left stationary for 24 hours at 23° C. and 50% RH, after which the viscosity was measured in the same manner as the case of the base material, and this viscosity was used as the 50° C.×4 W viscosity (in other words, the viscosity after storage). The viscosity increase rate was then calculated from the viscosity after storage and the initial viscosity and evaluated in accordance with the following evaluation criteria.

Cases with a viscosity increase rate of less than 1.3 were evaluated as being "excellent", cases with a viscosity increase rate of from 1.3 to 1.9 were evaluated as being "good", and cases with a viscosity increase rate of 2.0 or greater were evaluated as being "poor".

4) Deep Portion Curability

The base material and curing agent were mixed and then poured into a container made of polyethylene and having a diameter of 30 mm and a depth of 7 mm, and the container was then placed in a 23° C., 50% RH environment. After application, the curing depth from the composition surface was measured at prescribed time intervals. The evaluation criteria were as follows.

Cases for which the composition had been cured to a depth of 5 mm or greater after the passage of one day at 23° C. were evaluated as "excellent", cases that cured to a depth of 5 mm or greater at one week at 23° C. were evaluated as being "good", cases that cured to less than 5 mm at one week at 23° C. were evaluated as being "fair", and cases that did not cure at one week at 23° C. were evaluated as being "poor".

TABLE 1

| | Compounded substances | General name | Examples 1 | 2 | 3 | 4 | 5 | 6 |
|---|---|---|---|---|---|---|---|---|
| Base material | (A) Epoxy resin | Bisphenol A epoxy resin *A1 | 100 | 100 | — | — | 100 | 100 |
| | | Ethylene glycol diglycidyl ether *A2 | — | — | 100 | — | — | — |
| | | Hydrogenated bisphenol A epoxy resin *A3 | — | — | — | 100 | — | — |
| | (B) Compound having Si—F bond | Fluorinated polymer (Synthesis Example 5) | 4 | 4 | 4 | 4 | 4 | 4 |
| | (B') Tin-based curing catalyst | Reaction product of dioctyltin salt and tetraethoxysilane *B'1 | — | — | — | — | — | — |
| | | Dibutyltin bis-acetylacetonate *B'2 | — | — | — | — | — | — |
| | (C) Alkoxysilane not having a primary amino group, and the like | 3-glycidoxypropyltrimethoxysilane *C1 | 1 | 0.5 | 1 | 1 | 1 | 1 |
| | | Vinyltrimethoxysilane *C2 | — | — | — | — | — | — |
| | | Phenyltrimethoxysilane *C3 | — | — | — | — | — | — |
| | | 3-methacryloxypropyltrimethoxysilane *C4 | — | — | — | — | — | — |
| | | 3-acryloxypropyltrimethoxysilane *C5 | — | — | — | — | — | — |
| | | 2-(3,4-epoxycyclohexyl)ethyltrimethoxysilane *C6 | — | — | — | — | — | — |
| | | Glycidoxyoctyltrimethoxysilane *C7 | — | — | — | — | — | — |
| | | Reaction product between 1 mole of aminosilane and 2 moles of epoxysilane *C8 | — | — | — | — | — | — |
| | | 3-ureidopropyltrimethoxysilane *C9 | — | — | — | — | — | — |
| | | Diphenyldimethoxysilane *C10 | — | — | — | — | — | — |
| | | 3-glycidoxypropylmethyldimethoxysilane *C11 | — | — | — | — | — | — |
| | | 3-glycidoxypropylmethyldiethoxysilane *C12 | — | — | — | — | — | — |
| | | 3-glycidoxypropyltriethoxysilane *C13 | — | — | — | — | — | — |
| | (C') Silane compound other than (C) | 3-mercaptopropyltrimethoxysilane *C'1 | — | — | — | — | — | — |
| | | 3-aminopropyltrimethoxysilane *C'2 | — | — | — | — | — | — |
| | | N-(n-butylamino)propyltrimethoxysilane *C'3 | — | — | — | — | — | — |
| | (F) Water | Water | — | — | — | — | — | — |
| Curing agent | (D) Crosslinkable silicon group-containing organic polymer | Polyoxyalkylene polymer (1) (Synthesis Example 1) | 90 | 90 | 90 | 90 | — | — |
| | | Polyoxyalkylene polymer (2) (Synthesis Example 2) | — | — | — | — | — | 54 |
| | | Polyoxyalkylene polymer (3) (Synthesis Example 3) | — | — | — | — | — | — |
| | | Acrylic polymer (1) (Synthesis Example 4) | — | — | — | — | — | 36 |
| | | Polymer with polyisobutylene skeleton *D1 | — | — | — | — | 90 | — |
| | (E) Tertiary amine compound | 2,4,6-tris(dimethylaminomethyl)phenol *E1 | 8 | 8 | 8 | 8 | 8 | 8 |
| | | 1,8-diazabicyclo[5.4.0]-undec-7-ene (DBU) *E2 | 1 | 1 | 1 | 1 | 1 | 1 |
| | (G) Adhesiveness imparting agent | N-(2-aminoethyl)-3-aminopropyltrimethoxysilane *G1 | 2 | 2 | 2 | 2 | 2 | 2 |
| Evaluation | Tack-free time (min) | Initial | 12.5 | 13 | 10 | 6.5 | 35 | 25 |
| | | 50° C. × 4 W | 11 | 16 | 7.5 | 7 | 35 | 25 |
| | | Delay rate | 0.9 | 1.2 | 0.8 | 1.1 | 1 | 1 |
| | | Measurement | Excellent | Good | Excellent | Excellent | Excellent | Excellent |
| | Base material viscosity (Pa·s/23° C.) | Initial | 15.9 | 17.9 | 0.092 | 2.8 | 15.9 | 15.9 |
| | | 50° C. × 4 W | 17.9 | 20 | 0.104 | 3.7 | 17.9 | 17.9 |
| | | Viscosity increase rate | 1.1 | 1.1 | 1.1 | 1.3 | 1.1 | 1.1 |
| | | Measurement | Excellent | Excellent | Excellent | Good | Excellent | Excellent |

TABLE 1-continued

| | | | | | | | | |
|---|---|---|---|---|---|---|---|---|
| | Curing agent viscosity (Pa·s/23° C.) | Initial | 18.2 | 18.2 | 18.2 | 18.2 | 70.8 | 37 |
| | | 50° C. × 4 W | 21.2 | 21.2 | 21.2 | 21.2 | 87.6 | 43.4 |
| | | Viscosity increase rate | 1.2 | 1.2 | 1.2 | 1.2 | 1.2 | 1.2 |
| | | Measurement | Excellent | Excellent | Excellent | Excellent | Excellent | Excellent |
| | Deep portion curability | | Good | Good | Good | Good | Good | Good |

| | Compounded substances | General name | Examples | | | | | |
|---|---|---|---|---|---|---|---|---|
| | | | 7 | 8 | 9 | 10 | 11 | 12 |
| Base material | (A) Epoxy resin | Bisphenol A epoxy resin *A1 | 100 | 100 | 100 | 100 | 100 | 100 |
| | | Ethylene glycol diglycidyl ether *A2 | — | — | — | — | — | — |
| | | Hydrogenated bisphenol A epoxy resin *A3 | — | — | — | — | — | — |
| | (B) Compound having Si—F bond | Fluorinated polymer (Synthesis Example 5) | 4 | 4 | 4 | 4 | 4 | 4 |
| | (B') Tin-based curing catalyst | Reaction product of dioctyltin salt and tetraethoxysilane *B'1 | — | — | — | — | — | — |
| | | Dibutyltin bis-acetylacetonate *B'2 | — | — | — | — | — | — |
| | (C) Alkoxysilane not having a primary amino group, and the like | 3-glycidoxypropyltrimethoxysilane *C1 | 1 | — | — | — | — | — |
| | | Vinyltrimethoxysilane *C2 | — | 1 | — | — | — | — |
| | | Phenyltrimethoxysilane *C3 | — | — | 1 | — | — | — |
| | | 3-methacryloxypropyltrimethoxysilane *C4 | — | — | — | 1 | — | — |
| | | 3-acryloxypropyltrimethoxysilane *C5 | — | — | — | — | 1 | — |
| | | 2-(3,4-epoxycyclohexyl)ethyltrimethoxysilane *C6 | — | — | — | — | — | 1 |
| | | Glycidoxyoctyltrimethoxysilane *C7 | — | — | — | — | — | — |
| | | Reaction product between 1 mole of aminosilane and 2 moles of epoxysilane *C8 | — | — | — | — | — | — |
| | | 3-ureidopropyltrimethoxysilane *C9 | — | — | — | — | — | — |
| | | Diphenyldimethoxysilane *C10 | — | — | — | — | — | — |
| | | 3-glycidoxypropylmethyldimethoxysilane *C11 | — | — | — | — | — | — |
| | | 3-glycidoxypropylmethyldieth oxy silane *C12 | — | — | — | — | — | — |
| | | 3-glycidoxypropyltriethoxysilane *C13 | — | — | — | — | — | — |
| | (C') Silane compound other than (C) | 3-mercaptopropyltrimethoxysilane *C'1 | — | — | — | — | — | — |
| | | 3-aminopropyltrimethoxysilane *C'2 | — | — | — | — | — | — |
| | | N-(n-butylamino)propyltrimethoxysilane *C'3 | — | — | — | — | — | — |
| | (F) Water | Water | — | — | — | — | — | — |
| Curing agent | (D) Crosslinkable silicon group-containing organic polymer | Polyoxyalkylene polymer (1) (Synthesis Example 1) | — | 90 | 90 | 90 | 90 | 90 |
| | | Polyoxyalkylene polymer (2) (Synthesis Example 2) | — | — | — | — | — | — |
| | | Polyoxyalkylene polymer (3) (Synthesis Example 3) | 90 | — | — | — | — | — |
| | | Acrylic polymer (1) (Synthesis Example 4) | — | — | — | — | — | — |
| | | Polymer with polyisobutylene skeleton *D1 | — | — | — | — | — | — |
| | (E) Tertiary amine compound | 2,4,6-tris(dimethylaminomethyl)phenol *E1 | 8 | 8 | 8 | 8 | 8 | 8 |
| | | 1,8-diazabicyclo[5.4.0]-undec-7-ene (DBU) *E2 | — | 1 | 1 | 1 | 1 | 1 |
| | (G) Adhesiveness imparting agent | N-(2-aminoethyl)-3-aminopropyltrimethoxysilane *G1 | 2 | 2 | 2 | 2 | 2 | 2 |
| Evaluation | Tack-free time (min) | Initial | 12 | 11.5 | 12 | 12 | 11.5 | 12.5 |
| | | 50° C. × 4 W | 8 | 10.5 | 9.5 | 11 | 10.5 | 11.5 |
| | | Delay rate | 0.7 | 0.9 | 0.8 | 0.9 | 0.9 | 0.9 |
| | | Measurement | Excellent | Excellent | Excellent | Excellent | Excellent | Excellent |
| | Base material viscosity (Pa·s/23° C.) | Initial | 15.9 | 15.4 | 15.4 | 16.3 | 16 | 17.6 |
| | | 50° C. × 4 W | 17.9 | 17.2 | 18.3 | 19.5 | 18.4 | 21.3 |
| | | Viscosity increase rate | 1.1 | 1.1 | 1.2 | 1.2 | 1.2 | 1.2 |
| | | Measurement | Excellent | Excellent | Excellent | Excellent | Excellent | Excellent |
| | Curing agent viscosity (Pa·s/23° C.) | Initial | 19.6 | 18.2 | 18.2 | 18.2 | 18.2 | 18.2 |
| | | 50° C. × 4 W | 34.5 | 21.2 | 21.2 | 21.2 | 21.2 | 21.2 |
| | | Viscosity increase rate | 1.8 | 1.2 | 1.2 | 1.2 | 1.2 | 1.2 |
| | | Measurement | Good | Excellent | Excellent | Excellent | Excellent | Excellent |
| | Deep portion curability | | Good | Good | Good | Good | Good | Good |

| | Compounded substances | General name | Examples | | | | | |
|---|---|---|---|---|---|---|---|---|
| | | | 13 | 14 | 15 | 16 | 17 | 18 |
| Base material | (A) Epoxy resin | Bisphenol A epoxy resin *A1 | 100 | 100 | 100 | 100 | 100 | 100 |
| | | Ethylene glycol diglycidyl ether *A2 | — | — | — | — | — | — |
| | | Hydrogenated bisphenol A epoxy resin *A3 | — | — | — | — | — | — |
| | (B) Compound having Si—F bond | Fluorinated polymer (Synthesis Example 5) | 4 | 4 | 4 | 4 | 4 | 4 |

TABLE 1-continued

| | | | | | | | | |
|---|---|---|---|---|---|---|---|---|
| | (B') Tin-based curing catalyst | Reaction product of dioctyltin salt and tetraethoxysilane *B'1 | — | — | — | — | — | — |
| | | Dibutyltin bis-acetylacetonate *B'2 | — | — | — | — | — | — |
| | (C) Alkoxysilane not having a primary amino group, and the like | 3-glycidoxypropyltrimethoxysilane *C1 | — | — | — | — | — | — |
| | | Vinyltrimethoxysilane *C2 | — | — | — | — | — | — |
| | | Phenyltrimethoxysilane *C3 | — | — | — | — | — | — |
| | | 3-methacryloxypropyltrimethoxysilane *C4 | — | — | — | — | — | — |
| | | 3-acryloxypropyltrimethoxysilane *C5 | — | — | — | — | — | — |
| | | 2-(3,4-epoxycyclohexyl)ethyltrimethoxysilane *C6 | — | — | — | — | — | — |
| | | Glycidoxyoctyltrimethoxysilane *C7 | 1 | — | — | — | — | — |
| | | Reaction product between 1 mole of aminosilane and 2 moles of epoxysilane *C8 | — | 1 | — | — | — | — |
| | | 3-ureidopropyltrimethoxysilane *C9 | — | — | 1 | — | — | — |
| | | Diphenyldimethoxysilane *C10 | — | — | — | 1 | — | — |
| | | 3-glycidoxypropylmethyldimethoxysilane *C11 | — | — | — | — | 1 | — |
| | | 3-glycidoxypropylmethyldiethoxysilane *C12 | — | — | — | — | — | 1 |
| | | 3-glycidoxypropyltriethoxysilane *C13 | — | — | — | — | — | — |
| | (C') Silane compound other than (C) | 3-mercaptopropyltrimethoxysilane *C'1 | — | — | — | — | — | — |
| | | 3-aminopropyltrimethoxysilane *C'2 | — | — | — | — | — | — |
| | | N-(n-butylamino)propyltrimethoxysilane *C'3 | — | — | — | — | — | — |
| | (F) Water | Water | — | — | — | — | — | — |
| Curing agent | (D) Crosslinkable silicon group-containing organic polymer | Polyoxyalkylene polymer (1) (Synthesis Example 1) | 90 | 90 | 90 | 90 | 90 | 90 |
| | | Polyoxyalkylene polymer (2) (Synthesis Example 2) | — | — | — | — | — | — |
| | | Polyoxyalkylene polymer (3) (Synthesis Example 3) | — | — | — | — | — | — |
| | | Acrylic polymer (1) (Synthesis Example 4) | — | — | — | — | — | — |
| | | Polymer with polyisobutylene skeleton *D1 | — | — | — | — | — | — |
| | (E) Tertiary amine compound | 2,4,6-tris(dimethylaminomethyl)phenol *E1 | 8 | 8 | 8 | 8 | 8 | 8 |
| | | 1,8-diazabicyclo[5.4.0]-undec-7-ene (DBU) *E2 | 1 | 1 | 1 | 1 | 1 | 1 |
| | (G) Adhesiveness imparting agent | N-(2-aminoethyl)-3-aminopropyltrimethoxysilane *G1 | 2 | 2 | 2 | 2 | 2 | 2 |
| Evaluation | Tack-free time (min) | Initial | 13 | 11.5 | 14 | 14.5 | 15 | 14 |
| | | 50° C. × 4 W | 11.5 | 13.5 | 15 | 18 | 16 | 16 |
| | | Delay rate | 0.9 | 1.2 | 1.1 | 1.2 | 1.1 | 1.1 |
| | | Measurement | Excellent | Good | Excellent | Good | Excellent | Excellent |
| | Base material viscosity (Pa · s/23° C.) | Initial | 15.3 | 15.9 | 16.6 | 17.4 | 14.9 | 15.1 |
| | | 50° C. × 4 W | 18.3 | 19.8 | 18 | 21.3 | 19.3 | 19.8 |
| | | Viscosity increase rate | 1.2 | 1.2 | 1.1 | 1.2 | 1.3 | 1.3 |
| | | Measurement | Excellent | Excellent | Excellent | Excellent | Good | Good |
| | Curing agent viscosity (Pa · s/23° C.) | Initial | 18.2 | 18.2 | 18.2 | 18.2 | 18.2 | 18.2 |
| | | 50° C. × 4 W | 21.2 | 21.2 | 21.2 | 21.2 | 21.2 | 21.2 |
| | | Viscosity increase rate | 1.2 | 1.2 | 1.2 | 1.2 | 1.2 | 1.2 |
| | | Measurement | Excellent | Excellent | Excellent | Excellent | Excellent | Excellent |
| | | Deep portion curability | Good | Good | Good | Good | Good | Good |

| Compounded substances | | | Examples | Comparative Example | | |
|---|---|---|---|---|---|---|
| | | General name | 19 | 1 | 2 | 3 |
| Base material | (A) Epoxy resin | Bisphenol A epoxy resin *A1 | 100 | 100 | 100 | 100 |
| | | Ethylene glycol diglycidyl ether *A2 | — | — | — | — |
| | | Hydrogenated bisphenol A epoxy resin *A3 | — | — | — | — |
| | (B) Compound having Si—F bond | Fluorinated polymer (Synthesis Example 5) | 4 | — | — | — |
| | (B') Tin-based curing catalyst | Reaction product of dioctyltin salt and tetraethoxysilane *B'1 | — | 8.2 | 8.2 | — |
| | | Dibutyltin bis-acetylacetonate *B'2 | — | — | — | 4.8 |
| | (C) Alkoxysilane not having a primary amino group, and the like | 3-glycidoxypropyltrimethoxysilane *C1 | — | — | 1 | — |
| | | Vinyltrimethoxysilane *C2 | — | — | — | — |
| | | Phenyltrimethoxysilane *C3 | — | — | — | — |
| | | 3-methacryloxypropyltrimethoxysilane *C4 | — | — | — | — |
| | | 3-acryloxypropyltrimethoxysilane *C5 | — | — | — | — |
| | | 2-(3,4-epoxycyclohexyl)ethyltrimethoxysilane *C6 | — | — | — | — |
| | | Glycidoxyoctyltrimethoxysilane *C7 | — | — | — | — |
| | | Reaction product between 1 mole of aminosilane and 2 moles of epoxysilane *C8 | — | — | — | — |
| | | 3-ureidopropyltrimethoxysilane *C9 | — | — | — | — |
| | | Diphenyldimethoxysilane *C10 | — | — | — | — |
| | | 3-glycidoxypropylmethyldimethoxysilane *C11 | — | — | — | — |
| | | 3-glycidoxypropylmethyldiethoxysilane *C12 | — | — | — | — |
| | | 3-glycidoxypropyltriethoxysilane *C13 | 1 | — | — | — |

TABLE 1-continued

|  |  |  |  |  |  |  |
|---|---|---|---|---|---|---|
| | (C') Silane compound other than (C) | 3-mercaptopropyltrimethoxysilane *C'1 | — | — | — | — |
| | | 3-aminopropyltrimethoxysilane *C'2 | — | — | — | — |
| | | N-(n-butylamino)propyltrimethoxysilane *C'3 | — | — | — | — |
| | (F) Water | Water | — | — | — | — |
| Curing agent | (D) Crosslinkable silicon group-containing organic polymer | Polyoxyalkylene polymer (1) (Synthesis Example 1) | 90 | 90 | 90 | 90 |
| | | Polyoxyalkylene polymer (2) (Synthesis Example 2) | | | | |
| | | Polyoxyalkylene polymer (3) (Synthesis Example 3) | | | | |
| | | Acrylic polymer (1) (Synthesis Example 4) | | | | |
| | | Polymer with polyisobutylene skeleton *D1 | | | | |
| | (E) Tertiary amine compound | 2,4,6-tris(dimethylaminomethyl)phenol *E1 | 8 | 8 | 8 | 8 |
| | | 1,8-diazabicyclo[5.4.0]-undec-7-ene (DBU) *E2 | 1 | — | — | — |
| | (G) Adhesiveness imparting agent | N-(2-aminoethyl)-3-aminopropyltrimethoxysilane *G1 | 2 | 2 | 2 | 2 |
| Evaluation | Tack-free time (min) | Initial | 10.5 | 70 | 60 | 11.5 |
| | | 50° C. × 4 W | 13.5 | >180 | >180 | >60 |
| | | Delay rate | 1.3 | >3.0 | >3.0 | >5.0 |
| | | Measurement | Good | Poor | Poor | Poor |
| | Base material viscosity (Pa · s/23° C.) | Initial | 15.6 | 17.5 | 10.4 | 10.9 |
| | | 50° C. × 4 W | 21.3 | Separation and precipitation | Separation and precipitation | Separation and precipitation |
| | | Viscosity increase rate | 1.4 | — | — | — |
| | | Measurement | Good | Poor | Poor | Poor |
| | Curing agent viscosity (Pa · s/23° C.) | Initial | 18.2 | 18.2 | 18.2 | 18.2 |
| | | 50° C. × 4 W | 21.2 | 18.3 | 18.3 | 18.3 |
| | | Viscosity increase rate | 1.2 | 1 | 1 | 1 |
| | | Measurement | Excellent | Excellent | Excellent | Excellent |
| | | Deep portion curability | Good | Good | Good | Good |

| | Compounded substances | | Comparative Example | | | |
|---|---|---|---|---|---|---|
| | | General name | 4 | 5 | 6 | 7 |
| Base material | (A) Epoxy resin | Bisphenol A epoxy resin *A1 | 100 | 100 | 100 | 100 |
| | | Ethylene glycol diglycidyl ether *A2 | — | — | — | — |
| | | Hydrogenated bisphenol A epoxy resin *A3 | — | — | — | — |
| | (B) Compound having Si—F bond | Fluorinated polymer (Synthesis Example 5) | 4 | 4 | 4 | 4 |
| | (B') Tin-based curing catalyst | Reaction product of dioctyltin salt and tetraethoxysilane *B'1 | — | — | — | — |
| | | Dibutyltin bis-acetylacetonate *B'2 | — | — | — | — |
| | (C) Alkoxysilane not having a primary amino group, and the like | 3-glycidoxypropyltrimethoxysilane *C1 | — | — | — | — |
| | | Vinyltrimethoxysilane *C2 | — | — | — | — |
| | | Phenyltrimethoxysilane *C3 | — | — | — | — |
| | | 3-methacryloxypropyltrimethoxysilane *C4 | — | — | — | — |
| | | 3-acryloxypropyltrimethoxysilane *C5 | — | — | — | — |
| | | 2-(3,4-epoxycyclohexyl)ethyltrimethoxysilane *C6 | — | — | — | — |
| | | Glycidoxyoctyltrimethoxysilane *C7 | — | — | — | — |
| | | Reaction product between 1 mole of aminosilane and 2 moles of epoxysilane *C8 | — | — | — | — |
| | | 3-ureidopropyltrimethoxysilane *C9 | — | — | — | — |
| | | Diphenyldimethoxysilane *C10 | — | — | — | — |
| | | 3-glycidoxypropylmethyldimethoxysilane *C11 | — | — | — | — |
| | | 3-glycidoxypropylmethyldiethoxysilane *C12 | — | — | — | — |
| | | 3-glycidoxypropyltriethoxysilane *C13 | — | — | — | — |
| | (C') Silane compound other than (C) | 3-mercaptopropyltrimethoxysilane *C'1 | — | 1 | — | — |
| | | 3-aminopropyltrimethoxysilane *C'2 | — | — | 1 | — |
| | | N-(n-butylamino)propyltrimethoxysilane *C'3 | — | — | — | 1 |
| | (F) Water | Water | — | — | — | — |
| Curing agent | (D) Crosslinkable silicon group-containing organic polymer | Polyoxyalkylene polymer (1) (Synthesis Example 1) | 90 | 90 | 90 | 90 |
| | | Polyoxyalkylene polymer (2) (Synthesis Example 2) | | | | |
| | | Polyoxyalkylene polymer (3) (Synthesis Example 3) | | | | |
| | | Acrylic polymer (1) (Synthesis Example 4) | — | — | — | — |
| | | Polymer with polyisobutylene skeleton *D1 | — | — | — | — |
| | (E) Tertiary amine compound | 2,4,6-tris(dimethylaminomethyl)phenol *E1 | 8 | 8 | 8 | 8 |
| | | 1,8-diazabicyclo[5.4.0]-undec-7-ene (DBU) *E2 | 1 | 1 | 1 | 1 |
| | (G) Adhesiveness imparting agent | N-(2-aminoethyl)-3-aminopropyltrimethoxysilane *G1 | 2 | 2 | 2 | 2 |

TABLE 1-continued

| Evaluation | | | | | | |
|---|---|---|---|---|---|---|
| | Tack-free time (min) | Initial | 15 | 12.5 | Not measurable | Not measurable |
| | | 50° C. × 4 W | 18.5 | 16 | — | — |
| | | Delay rate | 1.2 | 1.3 | — | — |
| | | Measurement | Good | Good | Poor | Poor |
| | Base material viscosity (Pa · s/23° C.) | Initial | 20.6 | 15.3 | Gelled | Gelled |
| | | 50° C. × 4 W | 30.7 | Gelled | — | — |
| | | Viscosity increase rate | 1.5 | — | — | — |
| | | Measurement | Fair | Poor | Poor | Poor |
| | Curing agent viscosity (Pa · s/23° C.) | Initial | 18.2 | 18.2 | 18.2 | 18.2 |
| | | 50° C. × 4 W | 21.2 | 21.2 | 21.2 | 21.2 |
| | | Viscosity increase rate | 1.2 | 1.2 | 1.2 | 1.2 |
| | | Measurement | Excellent | Excellent | Excellent | Excellent |
| | | Deep portion curability | Good | Good | Good | Not measurable |

The details of the compounded substances in Table 1 and the below-described Table 2 are as follows.

*A1: Trade name jER828, available from Mitsubishi Chemical Corporation, number average molecular weight of 370.

*A2: Trade name Adeka Resin ED-506, available from Adeka Corporation, number average molecular weight of 620.

*A3: Trade name Adeka Resin EP-4080E, available from Adeka Corporation, number average molecular weight of 350.

*B'1: Trade name: Neostann S-1, available from Nitto Kasei Co., Ltd.

*B'2: Trade name: Neostann U220H, available from Nitto Kasei Co., Ltd.

*C1: Trade name: Shin-Etsu Silicone KBM-403, available from Shin-Etsu Chemical Co., Ltd.

*C2: Trade name: Shin-Etsu Silicone KBM-1003, available from Shin-Etsu Chemical Co., Ltd.

*C3: Trade name: Shin-Etsu Silicone KBM-103, available from Shin-Etsu Chemical Co., Ltd.

*C4: Trade name: Shin-Etsu Silicone KBM-503, available from Shin-Etsu Chemical Co., Ltd.

*C5: Trade name: Shin-Etsu Silicone KBM-5103, available from Shin-Etsu Chemical Co., Ltd.

*C6: Trade name: Shin-Etsu Silicone KBM-303, available from Shin-Etsu Chemical Co., Ltd.

*C7: Trade name: Shin-Etsu Silicone KBM-4803, available from Shin-Etsu Chemical Co., Ltd.

*C8: Reaction product in which first amino groups and secondary amino groups substantially do not remain, obtained by reacting 1 mole of an amino silane (3-aminopropyltrimethoxysilane) and 2 moles of an epoxysilane (3-glycidoxypropyltrimethoxysilane) at 50° C. for one week.

*C9: Trade name: Shin-Etsu Silicone KBM-585, available from Shin-Etsu Chemical Co. Ltd.

*C10: Trade name: Shin-Etsu Silicone KBM-202SS, available from Shin-Etsu Chemical Co. Ltd.

*C11: Trade name: Shin-Etsu Silicone KBM-402, available from Shin-Etsu Chemical Co. Ltd.

*C12: Trade name: Shin-Etsu Silicone KBE402, available from Shin-Etsu Chemical Co. Ltd.

*C13: Trade name: Shin-Etsu Silicone KBE403, available from Shin-Etsu Chemical Co. Ltd.

*C'1: Trade name: Shin-Etsu Silicone KBM-803, available from Shin-Etsu Chemical Co. Ltd.

*C'2: Trade name: Shin-Etsu Silicone KBM-903, available from Shin-Etsu Chemical Co. Ltd.

*C'3: Trade name Dynasylan 1189, available from Evonik Industries AG.

*D1: Dimethoxysilyl group-terminated polyisobutylene (PIB) polymer, trade name Epion EP-505S, available from Kaneka Corporation.

*E1: Trade name Versamine EH-30, available from Cognis Japan Ltd,

*E2: DBU, available from San-Apro Ltd.

*G1: Trade name: Shin-Etsu Silicone KBM-603, available from Shin-Etsu Chemical Co., Ltd.

The following points are clear from Table 1.

(1) In comparison to the compositions of Comparative Examples 1 to 3, in which a tin compound as the silanol condensation catalyst was used, the compositions of Examples 1 to 19 exhibited excellent tack-free time after storage, and the deterioration of the base materials did not occur.

(2) In comparison to the composition of Comparative Example 4, in which a silane compound of the component (C) was not used, and the compositions of Comparative Examples 5 to 7, in which silane compounds other than the component (C) were used, the compositions of Examples 1 to 19 did not experience the deterioration of the base material.

Examples 20 to 23 and Comparative Examples 8 and 9

The base materials and curing agents of the examples were prepared in the same manner as Examples 1 to 19 with the exception that the compounded substances were changed as shown in Table 2. Water was added to the compositions of these examples and comparative examples. The characteristics of the obtained base materials and curing agents were measured in the same manner as Examples 1 to 19. The results are shown in Table 2.

TABLE 2

| | Compounded substances | General name | Examples | | | |
|---|---|---|---|---|---|---|
| | | | 20 | 21 | 22 | 23 |
| Base material | (A) Epoxy resin | Bisphenol A epoxy resin *A1 | 100 | 100 | 100 | 100 |
| | (B) Compound having Si—F bond | Fluorinated polymer (Synthesis Example 5) | 4 | 4 | 4 | 4 |
| | (B') Tin-based curing catalyst | Dibutyltin bisacetylacetonate *B'2 | — | — | — | — |
| | (C) Alkoxysilane not having a primary amino group, and the like | 3-glycidoxypropyltrimethoxysilane *C1 | 1 | 0.5 | — | — |
| | | Phenyltrimethoxysilane *C3 | — | — | 1 | — |
| | | 3-methacryloxypropyltrimethoxysilane *C4 | — | — | — | 1 |
| | (F) Water | Water | 0.5 | 0.5 | 0.5 | 0.5 |
| Curing agent | (D) Crosslinkable silicon group-containing organic polymer | Polyoxyalkylene polymer (1) (Synthesis Example 1) | 90 | 90 | 90 | 90 |
| | (E) Tertiary amine compound | 2,4,6-tris(dimethylaminomethyl)phenol *E1 | 8 | 8 | 8 | 8 |
| | | 1,8-Diazabicyclo[5.4.0]-undec-7-ene (DBU) *E2 | 1 | 1 | 1 | 1 |
| | (G) Adhesiveness imparting agent | N-(2-aminoethyl)-3-aminopropyltrimethoxysilane *G1 | 2 | 2 | 2 | 2 |
| Evaluation | Tack-free time (min) | Initial | 9.5 | 9 | 8.5 | 9.5 |
| | | 50° C. × 4 W | 8 | 10 | 9.5 | 9 |
| | | Delay rate | 0.8 | 1.1 | 1.1 | 0.9 |
| | | Measurement | Excellent | Excellent | Excellent | Excellent |
| | Base material viscosity (Pa · s/23° C.) | Initial | 9.4 | 12.6 | 10.5 | 11.4 |
| | | 50° C. × 4 W | 12 | 13.8 | 6 | 1.27 |
| | | Viscosity increase rate | 1.3 | 1.1 | 1.3 | 1.1 |
| | | Measurement | Good | Excellent | Good | Excellent |
| | Curing agent viscosity (Pa · s/23° C.) | Initial | 18.2 | 18.2 | 18.2 | 18.2 |
| | | 50° C. × 4 W | 21.2 | 21.2 | 21.2 | 21.2 |
| | | Viscosity increase rate | 1.2 | 1.2 | 1.2 | 1.2 |
| | | Measurement | Excellent | Excellent | Excellent | Excellent |
| | | Deep portion curability | Excellent | Excellent | Excellent | Excellent |

| | Compounded substances | General name | Comparative Example | |
|---|---|---|---|---|
| | | | 8 | 9 |
| Base material | (A) Epoxy resin | Bisphenol A epoxy resin *A1 | 100 | 100 |
| | (B) Compound having Si—F bond | Fluorinated polymer (Synthesis Example 5) | — | 4 |
| | (B') Tin-based curing catalyst | Dibutyltin bisacetylacetonate *B'2 | 4.8 | — |
| | (C) Alkoxysilane not having a primary amino group, and the like | 3-glycidoxypropyltrimethoxysilane *C1 | 1 | — |
| | | Phenyltrimethoxysilane *C3 | — | — |
| | | 3-methacryloxypropyltrimethoxysilane *C4 | — | — |
| | (F) Water | Water | 0.5 | 0.5 |
| Curing agent | (D) Crosslinkable silicon group-containing organic polymer | Polyoxyalkylene polymer (1) (Synthesis Example 1) | 90 | 90 |
| | (E) Tertiary amine compound | 2,4,6-tris(dimethylaminomethyl)phenol *E1 | 8 | 8 |
| | | 1,8-Diazabicyclo [5.4.0]-undec-7-ene (DBU) *E2 | — | 1 |
| | (G) Adhesiveness imparting agent | N-(2-aminoethyl)-3-aminopropyltrimethoxysilane *G1 | 2 | 2 |
| Evaluation | Tack-free time (min) | Initial | 8.5 | 12 |
| | | 50° C. × 4 W | 24 | >60.0 |
| | | Delay rate | 2.8 | >5.0 |
| | | Measurement | Poor | Poor |
| | Base material viscosity (Pa · s/23° C.) | Initial | 7.2 | 14 |
| | | 50° C. × 4 W | Separation and precipitation | 60.4 |
| | | Viscosity increase rate | — | 4.3 |
| | | Measurement | Poor | Poor |
| | Curing agent viscosity (Pa · s/23° C.) | Initial | 18.2 | 18.2 |
| | | 50° C. × 4 W | 18.3 | 21.2 |
| | | Viscosity increase rate | 1 | 1.2 |
| | | Measurement | Excellent | Excellent |
| | | Deep portion curability | Excellent | Excellent |

Water was added to the base materials of the compositions of the examples and comparative examples of Table 2. Therefore, these compositions of course exhibited excellent deep portion curability. In addition to deep portion curability, the following points are clear from Table 2.

(3) In comparison to the composition of Comparative Example 8, in which a tin compound is used as the silanol condensation catalyst, the compositions of Examples 20 to 23 exhibited excellent tack-free time after storage, and the deterioration of the base materials did not occur.

(4) In comparison to the composition of Comparative Example 9, in which a silane compound of the component (C) was not used, the compositions of Examples 20 to 23 exhibited excellent tack-free time after storage, and the deterioration of the base materials did not occur.

(5) The composition of Comparative Example 9 is a composition that was obtained by further adding water to the composition of Comparative Example 4 (Table 1). The tack-free time after storage of Comparative Example 9 was significantly reduced compared to Comparative Example 4. In contrast, the composition of Example 20 is a composition that was obtained by further adding water to the composition of Example 1 (Table 1), and the tack-free time after storage of Example 20 was equivalent to that of Example 1. Thus, even in a case where water is added to the compositions of the present invention, the storage stability does not change. However, when water is added to the compositions of the comparative examples, the storage stability decreases significantly. This indicates that for cases in which water is added, the silane compound of the component (C) significantly prevents a worsening of the tack-free time after storage.

The invention claimed is:

1. A two-pack type epoxy resin composition comprising:
a base material comprising:
(A) an epoxy resin,
(B) a compound having an Si—F bond, and
(C) an alkoxysilane not having at least one group selected from the group consisting of a primary amino group, a secondary amino group, and a mercapto group;
and a curing agent comprising:
(D) a crosslinkable silicon group-containing organic polymer, and
(E) a tertiary amine compound.

2. The two-pack type epoxy resin composition according to claim 1, wherein the (E) tertiary amine compound is a tertiary amine compound having an active hydrogen group.

3. The two-pack type epoxy resin composition according to claim 1, wherein the base material further comprises (F) water.

4. The two-pack type epoxy resin composition according to claim 1, wherein the curing agent further comprises (G) an adhesiveness imparting agent.

5. A method for curing a two-pack type epoxy resin composition, the method comprising: mixing the base material and the curing agent according to claim 1; and curing a mixture of the base material and the curing agent.

6. A cured product of a two-pack type epoxy resin composition according to claim 1.

7. A product comprising a cured product of the two-pack type epoxy resin composition according to claim 1.

* * * * *